United States Patent
Jeong et al.

(10) Patent No.: US 12,267,522 B2
(45) Date of Patent: *Apr. 1, 2025

(54) METHOD AND APPARATUS FOR DECODING IMAGE USING INTERPICTURE PREDICTION

(71) Applicant: Industry-University Cooperation Foundation Hanyang University, Seoul (KR)

(72) Inventors: Je Chang Jeong, Seoul (KR); Ki Baek Kim, Seoul (KR); Do Kyung Lee, Seoul (KR)

(73) Assignee: Industry-University Cooperation Foundation Hanyang University, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/483,860

(22) Filed: Oct. 10, 2023

(65) Prior Publication Data

US 2024/0040143 A1 Feb. 1, 2024

Related U.S. Application Data

(63) Continuation of application No. 17/557,133, filed on Dec. 21, 2021, now Pat. No. 11,818,386, which is a
(Continued)

(30) Foreign Application Priority Data

Jan. 2, 2017 (KR) .................. 10-2017-0000404
Jan. 2, 2018 (KR) .................. 10-2018-0000034

(51) Int. Cl.
*H04N 19/52* (2014.01)
*H04N 19/176* (2014.01)
*H04N 19/91* (2014.01)

(52) U.S. Cl.
CPC .......... *H04N 19/52* (2014.11); *H04N 19/176* (2014.11); *H04N 19/91* (2014.11)

(58) Field of Classification Search
CPC ...... H04N 19/52; H04N 19/176; H04N 19/91; H04N 19/105; H04N 19/139;
(Continued)

(56) References Cited

U.S. PATENT DOCUMENTS 10,887,591 B2    1/2021   Sim et al.
2013/0070848 A1*  3/2013   Guo ............... H04N 19/176
                                          375/E7.243
(Continued)

FOREIGN PATENT DOCUMENTS

JP    2010-93646 A     4/2010
KR    10-2011-0017301 A   2/2011
(Continued)

OTHER PUBLICATIONS

Office Action issued in prior U.S. Appl. No. 16/475,217 mailed Aug. 3, 2020.
(Continued)

*Primary Examiner* — Hesham K Abouzahra
(74) *Attorney, Agent, or Firm* — Sughrue Mion, PLLC

(57) ABSTRACT

Disclosed are a method and apparatus for decoding an image using inter-prediction. The method of decoding an image using inter-prediction includes receiving a bitstream; acquiring a portion of information indicating a motion vector of a current block to be decoded in the received bitstream, obtaining the motion vector of the current block by using the acquired information to determine the remaining information other than the portion, and generating a prediction block for the current block through inter-prediction that uses the motion vector of the current block. Therefore, it is possible to improve image decoding/encoding efficiency.

6 Claims, 5 Drawing Sheets

Related U.S. Application Data continuation of application No. 16/475,217, filed as application No. PCT/KR2018/000062 on Jan. 2, 2018, now Pat. No. 11,240,526.

(58) Field of Classification Search
CPC .. H04N 19/513; H04N 19/521; H04N 19/625; H04N 19/94
See application file for complete search history.

(56) References Cited

U.S. PATENT DOCUMENTS

2017/0332099 A1* 11/2017 Lee ................. H04N 19/122
2018/0324437 A1* 11/2018 Kim ................. H04N 19/139
2018/0352247 A1  12/2018 Park et al.

FOREIGN PATENT DOCUMENTS

| KR | 10-2011-0023023 A | 3/2011 |
| KR | 10-2012-0033546 A | 4/2012 |
| KR | 10-2014-0016823 A | 2/2014 |
| KR | 10-2014-0022009 A | 2/2014 |
| KR | 10-2016-0119254 A | 10/2016 |
| KR | 10-2016-0143584 A | 12/2016 |

OTHER PUBLICATIONS

International Search Report for PCT/KR2018/000062 dated May 1, 2018 [PCT/ISA/210].
Notice of Allowance issued in prior U.S. Appl. No. 16/475,217 mailed Sep. 21, 2021.
Final Office Action issued in prior U.S. Appl. No. 16/475,217 mailed Feb. 12, 2021.
Office Action issued Jan. 10, 2023 in Korean Application No. 10-2018-0000034.
Office Action issued in parent U.S. Appl. No. 17/557,133 mailed Dec. 16, 2022.
Notice of Allowance issued in parent U.S. Appl. No. 17/557,133 mailed Jul. 12, 2023.

* cited by examiner

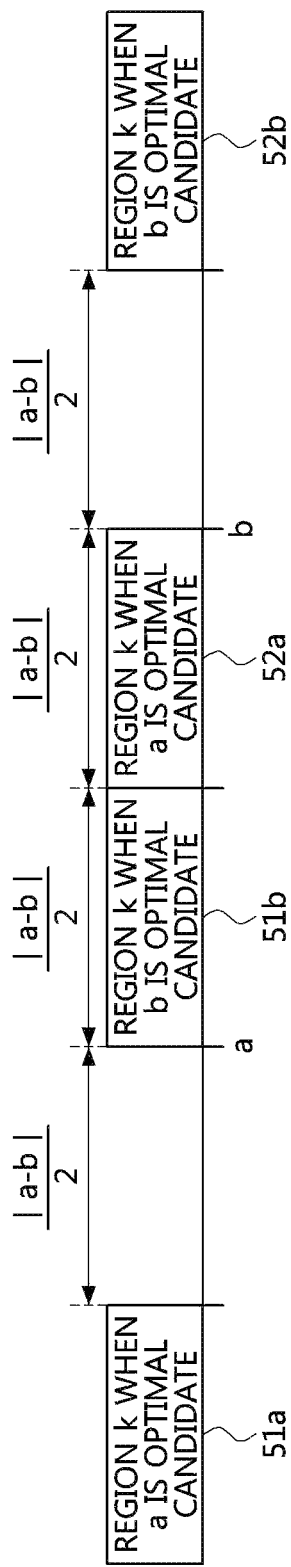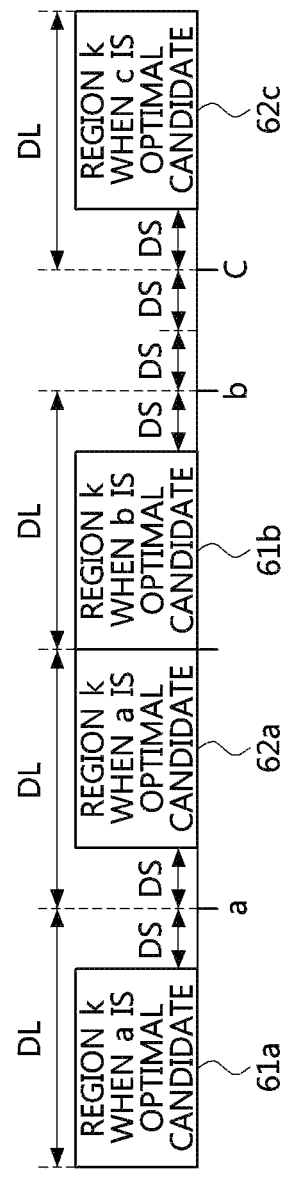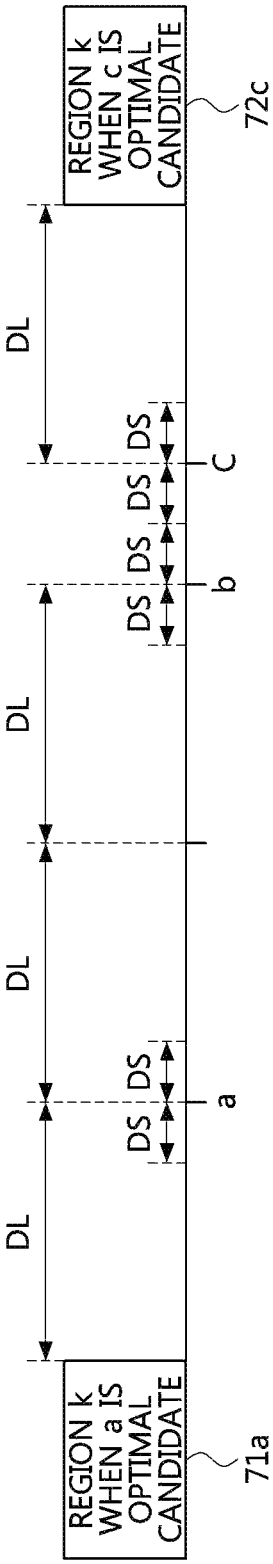

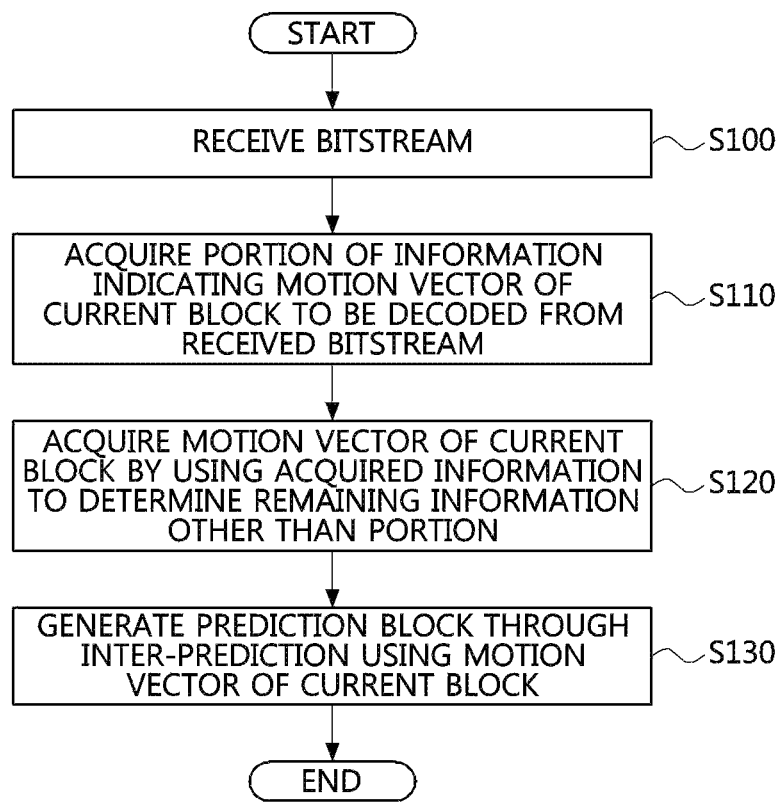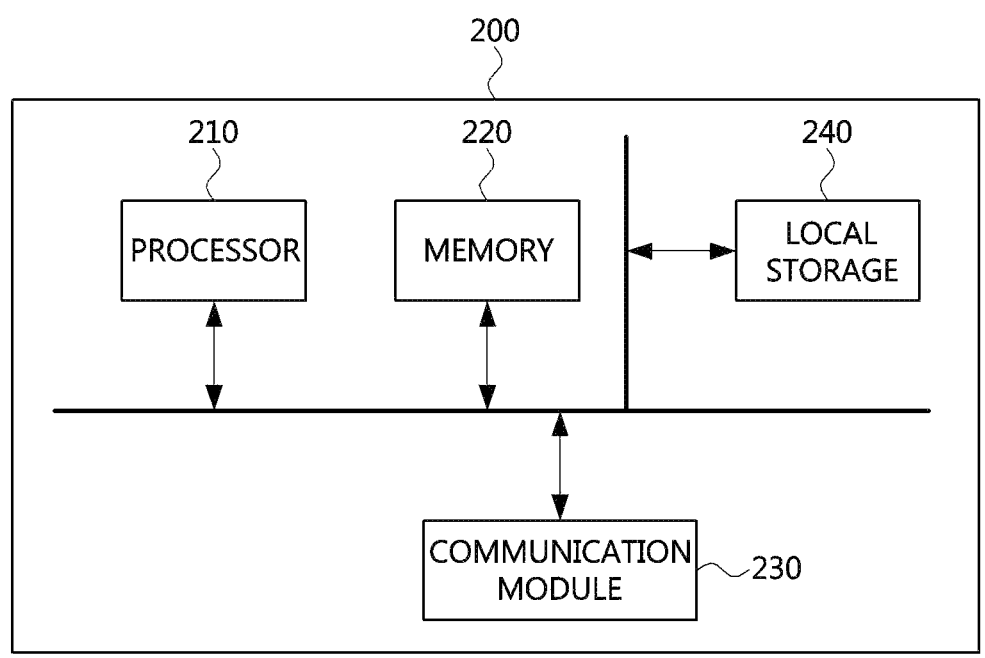

METHOD AND APPARATUS FOR DECODING IMAGE USING INTERPICTURE PREDICTION

CROSS REFERENCE TO RELATED APPLICATIONS

This application is a continuation of U.S. application Ser. No. 17/557,133 filed on Dec. 21, 2021, which is a continuation of U.S. application Ser. No. 16/475,217 filed on Jul. 1, 2019, now U.S. Pat. No. 11,240,526 issued Feb. 1, 2022, which is a National Stage of International Application No. PCT/KR2018/000062, filed on Jan. 2, 2018, which claims priority from Korean Patent Application No. 10-2017-0000404, filed on Jan. 2, 2017, and Korean Patent Application No. 10-2018-0000034, filed on Jan. 2, 2018.

TECHNICAL FIELD

The present invention relates to a method and apparatus for decoding an image using inter-prediction, and more particularly, to a technology for reducing the number of bits or data exchanged between an encoding apparatus and a decoding apparatus by using only a portion of information indicating the magnitude of a difference of a motion vector, the sign of a motion vector, and an optimal motion vector to determine the remaining information when a motion vector necessary for inter-prediction of a current block is encoded and decoded.

BACKGROUND ART

ISO/ISE Moving Picture Experts Group (MPEG) and ITU-T Video Coding Experts Group (VCEG) organized Joint Collaborative Team on Video Coding (JCV-VC) and established MPEG-H High Efficiency Video Coding (HEVC)/ITU-T H.265, which is a video compression standard technology, in January 2013. Also, in order to respond to the trend of popularizing high-quality images due to the recent rapid development of information communication technology, ISO/ISE MPEG and ITU-T VCEG organized the Joint Video Exploration Team (JVET) at the 22nd JCT-VC Geneva Conference and is actively striving to establish the next generation image compression technology standard for Ultra High Definition (UHD) images, which have a higher image resolution than High Definition (HD) images.

Meanwhile, according to a conventional video compression standard technology, a prediction block for a current block to be encoded is generated, and a difference between the prediction block and the current block is encoded, thereby reducing the amount of data to be encoded. Such a prediction technique includes an intra-prediction method for generating a prediction block for a current block using similarity with a spatially adjacent block in the same screen and an inter-prediction method for generating a prediction block for a current block using similarity with a block in a temporarily adjacent screen.

In this case, the inter-prediction uses a motion vector as information indicating a block having similarity in a screen temporarily adjacent to the current block. In this case, when the motion vector itself is encoded, a bit value may be very large. Thus, an encoding apparatus configures candidate motion vectors using a motion vector of a neighboring block adjacent to the current block, encodes a difference between the motion vector of the current block and an optimal motion vector selected from among the candidate motion vectors, and then transmits the encoded difference to a decoding apparatus.

However, even when the difference between the motion vector of the current block and the optimal motion vector is encoded, a reduction in consumption of the bit value is insignificant when the optimal motion vector is much different from the motion vector of the current block. Therefore, there is a need for a solution that can reduce the amount of information transferred between an encoding apparatus and a decoding apparatus in order to improve image encoding/decoding efficiency.

DISCLOSURE

Technical Problem

The present invention is directed to providing an image decoding method using inter-prediction.

The present invention is also directed to providing an image decoding apparatus using inter-prediction.

Technical Solution

According to an aspect of the present invention, there is provided an image decoding method using inter-prediction.

The image decoding method may comprise receiving a bitstream; acquiring a portion of information indicating a motion vector of a current block to be decoded in the received bitstream; acquiring the motion vector of the current block by using the acquired information to determine the remaining information other than the portion; and generating a prediction block for the current block through inter-prediction that uses the motion vector of the current block.

The information indicating the motion vector of the current block may include at least one of a size of a difference between the motion vector of the current block and an optimal motion vector selected from among two or more candidate motion vectors, a sign of the difference, and information indicating the optimal motion vector.

The acquiring of the motion vector of the current block may comprise determining whether the size of the difference corresponds to a predetermined condition; and determining the sign of the difference on the basis of the optimal motion vector acquired from the information indicating the optimal motion vector when the size of the difference corresponds to the predetermined condition.

The predetermined condition may be set on the basis of an interval between adjacent vectors among the two or more candidate motion vectors.

The determining of whether the size of the difference corresponds to the predetermined condition may comprise obtaining a largest interval between the adjacent vectors and a smallest interval between the adjacent vectors; and comparing the largest interval and the smallest interval to the size of the difference.

The predetermined condition may be set on the basis of half of the interval between the adjacent vectors.

The acquiring of the motion vector of the current block may comprise acquiring the difference using the size of the difference and the sign of the difference; determining an estimated motion vector of the current block by adding a first candidate motion vector among the two or more candidate motion vectors to the acquired difference; determining whether the estimated motion vector has a coordinate value closest to that of the first candidate motion vector among the two or more candidate motion vectors; and determining the optimal motion vector on the basis of a result of the determination.

The determining of the estimated motion vector and the determining of whether the estimated motion vector has the coordinate value closest to that of the first candidate motion vector may be repeatedly performed by replacing the remaining candidate motion vectors other than the first candidate motion vector with the first candidate motion vector.

The determining of the optimal motion vector may comprise, when a result of the repetition is that only one candidate motion vector has the closest coordinate value, determining the corresponding candidate motion vector as the optimal motion vector.

The acquiring of the motion vector of the current block may comprise determining whether the size of the difference corresponds to a predetermined condition; and excluding at least one of the two or more candidate motion vectors and determining the optimal motion vector among the remaining candidate motion vectors when the size of the difference corresponds to the predetermined condition.

According to another aspect of the present invention, there is provided an image decoding apparatus using inter-prediction.

The image decoding apparatus may comprise at least one processor; and a memory configured to store instructions for instructing the at least one processor to perform at least one step.

The at least one step may comprise receiving a bitstream; acquiring a portion of information indicating a motion vector of a current block to be decoded in the received bitstream; acquiring the motion vector of the current block by using the acquired information to determine the remaining information other than the portion; and generating a prediction block for the current block through inter-prediction that uses the motion vector of the current block.

The information indicating the motion vector of the current block may include at least one of a size of a difference between the motion vector of the current block and an optimal motion vector selected from among two or more candidate motion vectors, a sign of the difference, and information indicating the optimal motion vector.

The acquiring of the motion vector of the current block may comprise determining whether the size of the difference corresponds to a predetermined condition; and determining the sign of the difference on the basis of the optimal motion vector acquired from the information indicating the optimal motion vector when the size of the difference corresponds to the predetermined condition.

The predetermined condition may be set on the basis of an interval between adjacent vectors among the two or more candidate motion vectors.

The determining of whether the size of the difference corresponds to the predetermined condition may comprise obtaining a largest interval between the adjacent vectors and a smallest interval between the adjacent vectors; and comparing the largest interval and the smallest interval to the size of the difference.

The predetermined condition may be set on the basis of half of the interval between the adjacent vectors.

The acquiring of the motion vector of the current block may comprise acquiring the difference using the size of the difference and the sign of the difference; determining an estimated motion vector of the current block by adding a first candidate motion vector among the two or more candidate motion vectors to the acquired difference; determining whether the estimated motion vector has a coordinate value closest to that of the first candidate motion vector among the two or more candidate motion vectors, and determining the optimal motion vector on the basis of a result of the determination.

The determining of the estimated motion vector and the determining of whether the estimated motion vector has the coordinate value closest to that of the first candidate motion vector may be repeatedly performed by replacing the remaining candidate motion vectors other than the first candidate motion vector with the first candidate motion vector.

The determining of the optimal motion vector may comprise when a result of the repetition is that only one candidate motion vector has the closest coordinate value, determining the corresponding candidate motion vector as the optimal motion vector.

The acquiring of the motion vector of the current block may comprise determining whether the size of the difference corresponds to a predetermined condition; and excluding at least one of the two or more candidate motion vectors and determining the optimal motion vector among the remaining candidate motion vectors when the size of the difference corresponds to the predetermined condition.

Advantageous Effects

With the image decoding method and apparatus using inter-prediction according to the present invention, it is possible to reduce the number of bits consumed during an encoding/decoding process.

Therefore, advantageously, it is possible to improve an image compression rate.

DESCRIPTION OF DRAWINGS

FIG. 5 is an example diagram showing a region where a motion vector of a current block may be present when there are two candidate motion vectors.

FIG. 6 is a first example diagram showing a region where a motion vector of a current block may be present when there are three candidate motion vectors.

FIG. 7 is a second example diagram showing a region where a motion vector of a current block may be present when there are three candidate motion vectors.

FIG. 8 is a flowchart showing an image decoding method using inter-prediction according to an embodiment of the present invention.

FIG. 9 is a block diagram showing an image decoding apparatus using inter-prediction according to an embodiment of the present invention.

MODES OF THE INVENTION

Figure 1:
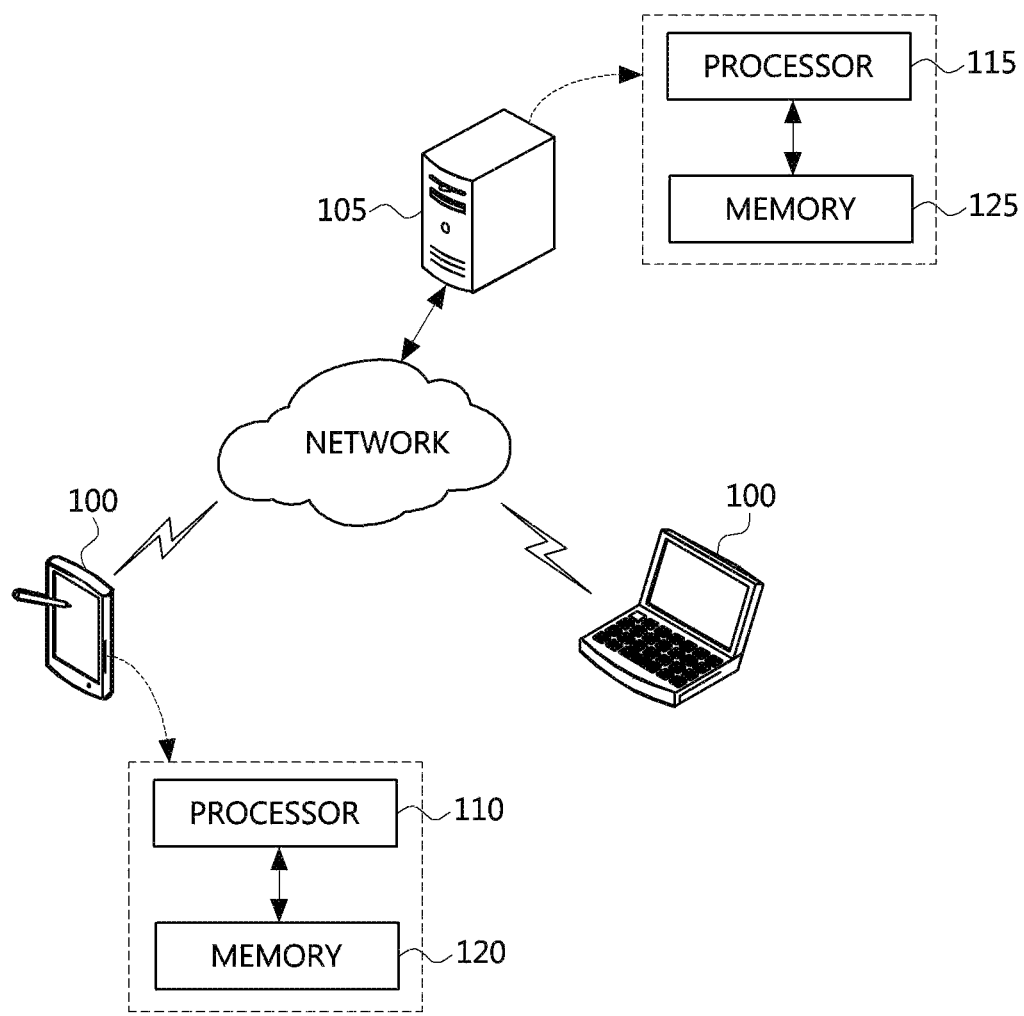
FIG. 1 is a conceptual view of an image encoding and decoding system according to an embodiment of the present invention.

Example embodiments of the present invention are disclosed herein. However, specific structural and functional details disclosed herein are merely representative for purposes of describing example embodiments of the present invention, and example embodiments of the present invention may be embodied in many alternative forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Generally, an image may be composed of a series of still images. The still images may be classified in units of a group of pictures (GOP), and each still image may be referred to as a picture. In this case, the picture may indicate one of frames and fields in a progressive signal and an interlaced signal. The picture may be represented as "frame" when encoding/decoding is performed in units of frames and may be represented as "field" when encoding/decoding is performed in units of fields. The present invention assumes a progressive signal, but may also be applied to an interlaced signal. As a higher concept, units such as a GOP and a sequence may exist, and also each picture may be segmented into predetermined regions such as slices, tiles, blocks, and the like. Also, one GOP may include units such as Picture I, Picture P, and Picture B. Picture I may refer to a picture that is autonomously encoded/decoded without using a reference picture, and Picture P and Picture B may refer to a picture that is encoded/decoded by performing a process such as motion estimation and motion compensation using a reference picture. Generally, Picture P may use Picture I and Picture B as reference pictures, and Picture B may use Picture I and Picture P as reference pictures. However, the above definitions may also be changed by settings of encoding/decoding.

Here, a picture referred to in encoding/decoding is called a reference picture, and a block or pixel referred to in encoding/decoding is called a reference block or a reference pixel. Also, reference data may include frequency-domain coefficients and various types of encoding/decoding information generated and determined during an encoding/decoding process, as well as spatial-domain pixel values. For example, the reference data may correspond to intra-prediction-related information or motion-related information in a prediction unit, transformation-related information in a transformation unit/an inverse transformation unit, quantization-related information in a quantization unit/an inverse quantization unit, encoding/decoding-related information (context information) in an encoding unit/a decoding unit, filter-related information in an in-loop filter unit, and the like.

The minimum unit of the image may be a pixel, and the number of bits used to represent one pixel is called a bit depth. Generally, the bit depth may be eight bits, and a bit depth of more than eight bits may be supported depending on encoding settings. At least one bit depth may be supported depending on a color space. Also, at least one color space may be included according to an image color format. One or more pictures having a predetermined size or one or more pictures having different sizes may be included according to a color format. For example, YCbCr 4:2:0 may be composed of one luminance component (Y in this example) and two chrominance components (Cb/Cr in this example). At this time, the composition ratio of the chrominance components and the luminance component may be 1:2 in width and height. As another example, YCbCr 4:4:4 may have the same composition ratio in width and height. Like the above example, when one or more color spaces are included, a picture may be segmented into the color spaces.

The present invention will be described on the basis of any color space (Y in this example) of any color format (YCbCr in this example), and this description will be applied to another color space (Cb and Cr in this example) of the color format in the same or a similar manner (settings dependent on a specific color space). However, a partial difference (settings independent of a specific color space) may be given to each color space. That is, the settings dependent on each color space may refer to settings proportional to or dependent on the composition ratio of the components (e.g., which is determined depending on 4:2:0, 4:2:2, or 4:4:4), and the settings independent of each color space may refer to settings of only a corresponding color space, independently from or regardless of the composition ratio of each component. In the present invention, some elements may have independent settings or dependent settings depending on the encoder/decoder.

Setting information or syntax elements needed during an image encoding process may be determined at a level of units such as a video, a sequence, a picture, a slice, a tile, a block, and the like. An encoder may add the setting information or syntax elements to a bitstream in units of a video parameter set (VPS), a sequence parameter set (SPS), a picture parameter set (PPS), a slice header, a tile header, a block header, or the like and transmit the bitstream to a decoder. The decoder may parse the bitstream at the same level, restore the setting information transmitted from the encoder, and use the setting information in an image decoding process. Also, related information may be transmitted through a bitstream in the form of supplement enhancement information (SEI) or metadata and then may be parsed and used. Each parameter set has a unique ID value, and a lower parameter set may have an ID value of an upper parameter set to be referred to. For example, a lower parameter set may refer to information of an upper parameter set having a corresponding ID value among one or more upper parameter sets. Among various examples of the above-described units, when any one unit includes one or more different units, the any one unit may be referred to as an upper unit, and the included units may be referred to as lower units.

Setting information having occurred in such a unit may include settings independent for each unit or settings dependent on a previous, following, or upper unit. Here, the dependent settings may be understood as indicating setting information of a corresponding unit using flag information corresponding to settings of the previous, following, or upper unit (e.g., 1-bit flag; 1 indicates Follow, and 0 indicates Do Not Follow). In the present invention, the setting information will be described focusing on an example of the independent settings. However, an example may also be included in which a relationship dependent on the setting information of the previous, following, or upper unit of the current unit is added to, or substituted for, the independent settings.

Preferred embodiments of the present invention will be described below in more detail with reference to the accompanying drawings.

FIG. 1 is a conceptual view of an image encoding and decoding system according to an embodiment of the present invention.

Referring to FIG. 1, an image encoding apparatus 105 and an image decoding apparatus 100 may be a user terminal such as a personal computer (PC), a notebook computer, a personal digital assistant (PDA), a portable multimedia player (PMP), a PlayStation Portable (PSP), a wireless communication terminal, a smartphone, and a TV or a server terminal such as an application server and a service server and may include a variety of apparatuses having a communication device, such as a communication modem, for communicating with various devices or wired/wireless communication networks, a memory 120 or 125 for storing various programs and data for performing inter- or intra-prediction to encode or decode an image, a processor 110 or 115 for executing programs to perform computation and control, and so on. Also, an image encoded into a bitstream by the image encoding apparatus 105 is transmitted to the image decoding apparatus 100 in real time or in non-real time through a wired/wireless communication network such as the Internet, a local area network (LAN), a wireless LAN, a WiBro network, or a mobile communication network or through a variety of communication interfaces such as a cable, a universal serial bus (USB), or the like. The bitstream may be decoded by the image decoding apparatus 100 to restore the image, and the image may be reproduced. Also, the image encoded into the bitstream by the image encoding apparatus 105 may be transferred from the image encoding apparatus 105 to the image decoding apparatus 100 through a computer-readable recording medium.

Figure 2:
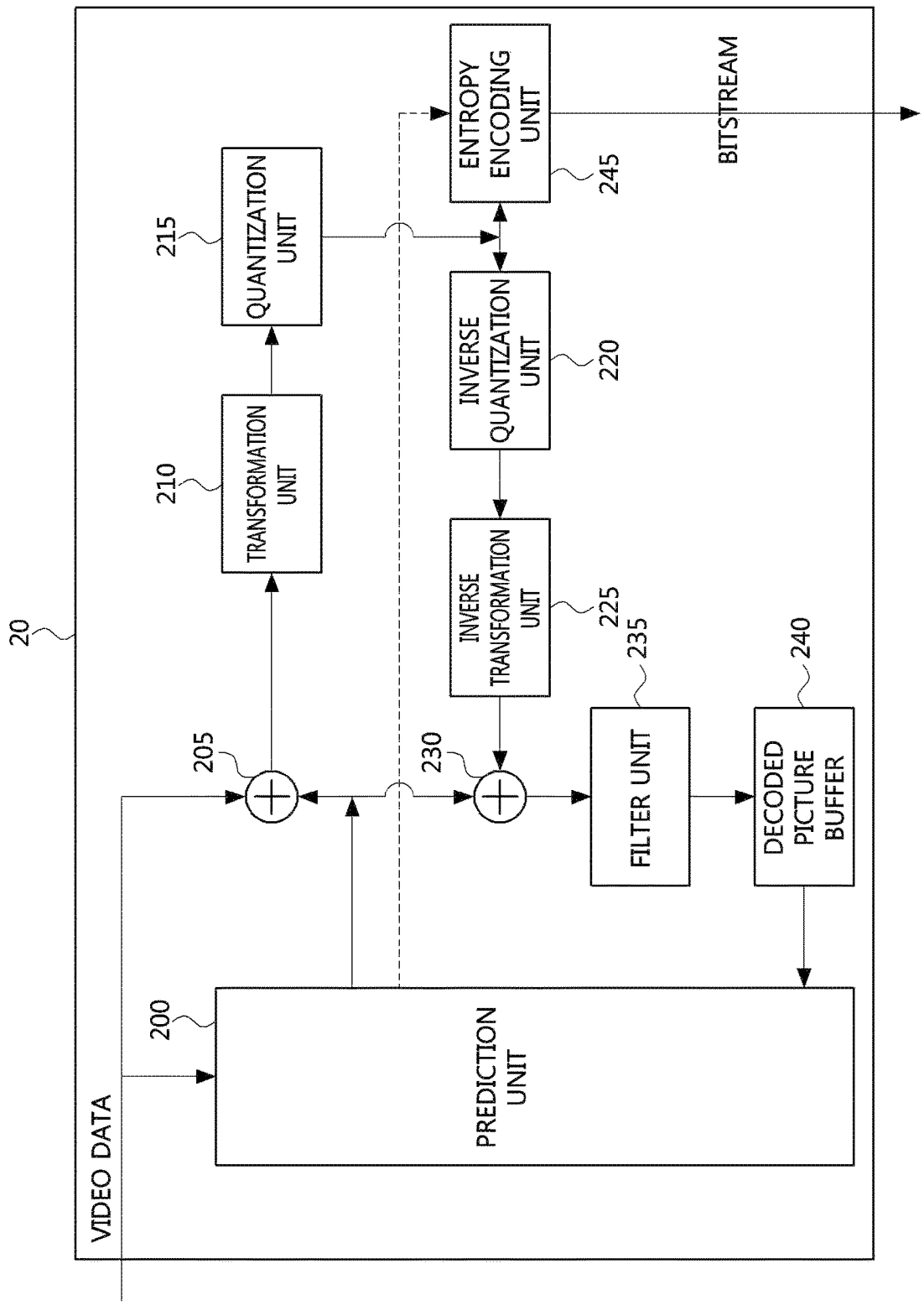
FIG. 2 is a block diagram of an image encoding apparatus according to an embodiment of the present invention.

FIG. 2 is a block diagram of an image encoding apparatus according to an embodiment of the present invention.

As shown in FIG. 2, an image encoding apparatus 20 according to the embodiment may include a prediction unit 200, a subtractor unit 205, a transformation unit 210, a quantization unit 215, an inverse quantization unit 220, an inverse transformation unit 225, an adder unit 230, a filter unit 235, a decoded picture buffer 240, and an entropy encoding unit 245.

The prediction unit 200 may include an intra-prediction unit configured to perform intra-prediction and an inter-prediction unit configured to perform inter-prediction. The intra-prediction may generate a prediction block by performing spatial prediction using a pixel of a block adjacent to a current block, and the inter-prediction may generate a prediction block by finding a region that best matches a current block on the basis of a reference image and performing motion compensation. Whether to use the intra-prediction or the inter-prediction may be determined for a corresponding unit (an encoding unit or a prediction unit), detailed information (e.g., an intra-prediction mode, a motion vector, a reference image, etc.) on each prediction method may be determined. In this case, a processing unit for performing prediction, a prediction method, and a processing unit for determining details may be determined through encoding/decoding settings. For example, a prediction method, a prediction mode, and the like may be determined in prediction units, and prediction may be performed in transformation units.

The subtractor unit 205 may subtract the prediction block from the current block to generate a residual block. That is, the subtractor unit 205 may calculate a difference between a pixel value of each pixel of the current block to be encoded and a predicted pixel value of a corresponding pixel of the prediction block generated through the prediction unit to generate a residual block, which is a block-type residual signal.

The transformation unit 210 transforms the residual block into a frequency domain to transform each pixel value of the residual block into a frequency coefficient. Here, the transformation unit 210 may transform a residual signal into the frequency domain by using various transformation techniques for transforming a picture signal on the spatial axis into the frequency axis, such as Hadamard transform, discrete cosine transform (DCT)-based transform, discrete sine transform (DST)-based transform, and Karhuhen-Loeve transform (KLT)-based transform. The residual signal transformed into the frequency domain is a frequency coefficient. The transformation may be made by a one-dimensional transformation matrix. Each transformation matrix may be adaptively used in horizontal and vertical units. For example, for the intra-prediction, when the prediction mode is horizontal, the DCT-based transformation matrix may be used in a vertical direction, and the DST-based transformation matrix may be used in a horizontal direction. When the prediction mode is vertical, the DCT-based transformation matrix may be used in a horizontal direction, and the DST-based transformation matrix may be used in a vertical direction.

The quantization unit 215 quantizes the residual block having the frequency coefficient obtained through the transformation into the frequency domain by the transformation unit 210. Here, the quantization unit 215 may quantize the transformed residual block by using a dead zone uniform threshold quantization, a quantization weighted matrix, or other enhanced quantization methods. One or more quantization methods may be provided as candidates and may be determined by an encoding mode, prediction mode information, and the like.

The entropy encoding unit 245 scans a generated quantization frequency coefficient string according to various scan schemes to generate a quantization coefficient string, encodes the generated quantization coefficient string using an entropy encoding technique or the like, and outputs the encoded string. One of various patterns such as a zigzag pattern, a diagonal pattern, and a raster pattern may be set as a pattern for the scanning.

The inverse quantization unit 220 inversely quantizes the residual block quantized by the quantization unit 215. That is, the inverse quantization unit 220 inversely quantizes the quantization frequency coefficient string to generate a residual block having a frequency coefficient.

The inverse transformation unit 225 inversely transforms the residual block that is inversely quantized by the inverse quantization unit 220. That is, the inverse transformation unit 225 inversely transforms the frequency coefficients of the inversely quantized residual block to generate a residual block having a pixel value, i.e., a restored residual block. Here, the inverse transformation unit 225 may perform inverse transformation by inversely using the transformation scheme used by the transformation unit 210.

The adder unit 230 adds the residual block restored by the inverse transformation unit 225 to the prediction block predicted by the prediction unit 200 to restore the current block. The restored current block may be stored in the decoded picture buffer 240 as a reference picture (or a reference block) and may be used as the reference picture when a block after the current block or another block or picture subsequent to the current block is encoded.

The filter unit 235 may perform a post-processing filtering process of one or more of a deblocking filter, a sample adaptive offset (SAO), an adaptive loop filter (ALF), and the like. The deblocking filter may remove block distortion generated at a boundary between blocks from the restored picture. The ALF may perform filtering on the basis of a value obtained by comparing an original image to an image restored after the block is filtered through the deblocking filter. The SAO may restore an offset difference between the original image and the residual block to which the deblocking filter is applied, in units of pixels and may be applied in the formed of a band offset, an edge offset, or the like. Such a post-processing filter may be applied to the restored picture or block.

The decoded picture buffer 240 may store the block or picture restored through the filter unit 235. The restored block or picture stored in the decoded picture buffer 240 may be provided to the prediction unit 200, which is configured to perform intra-prediction or inter-prediction.

Although not shown, a segmentation unit may be additionally included, and the restored block or picture may be segmented into encoding units having various sizes by the segmentation unit. In this case, such an encoding unit may be composed of a plurality of encoding blocks (e.g., one luminance encoding block and two chrominance encoding blocks, etc.) according to a color format. For convenience of description, one color component unit is assumed. The encoding block may have a variable size of M×M (e.g., M is 4, 8, 16, 32, 64, 128, or the like). Alternatively, depending on segmentation schemes (e.g., tree-based segmentation, quadtree segmentation, binary tree segmentation, etc.), the encoding block may have a variable size such as M×N (e.g., M and N are 4, 8, 16, 32, 64, 128, or the like). In this case, the encoding block may be a unit that is a basis for intra-prediction, inter-prediction, transformation, quantization, entropy coding, and the like. The present invention assumes that a plurality of sub-blocks having the same size and shape are acquired depending on the segmentation schemes. However, the present invention may also be applied to asymmetric sub-blocks (e.g., for a binary tree, 4M×4N is segmented into 3M×4N and M×4N or 4M×3N and 4M×N). In this case, the asymmetric sub-blocks may be supported by information used to determine whether the segmentation scheme for acquiring the symmetric sub-blocks will provide additional support according to the encoding/decoding settings.

The segmentation of the encoding block (with a size of M×N) may have a recursive tree-based structure. In this case, whether to perform segmentation may be represented through a segmentation flag (e.g., a quadtree segmentation flag, a binary segmentation flag, etc.). For example, when the segmentation flag of an encoding block having a segmentation depth of k indicates 0, the encoding of the encoding block may be performed on the encoding block having a segmentation depth of k. When the segmentation flag of the encoding block having a segmentation depth of k is 1, the encoding of the encoding block may be performed on four sub-encoding blocks (for quadtree segmentation) or two sub-encoding blocks (for binary tree segmentation), each of which has a segmentation depth of k+1, depending on the segmentation schemes. In this case, the size of the block may be $(M>>1)\times(N>>1)$ in the case of the four encoding blocks and may be $(M>>1)\times N$ or $M\times(N>>1)$ in the case of the two encoding blocks. Each of the sub-encoding blocks may be reset as an encoding block (k+1) and may be segmented into sub-encoding blocks (k+2) through the above process. In this case, one segmentation flag (e.g., a segmentation presence flag) may be supported in the case of the quadtree segmentation, and at least one (up to two) flag (e.g., a segmentation direction flag <horizontal or vertical; which may be omitted in some cases depending on a preceding upper or previous segmentation result> in addition to the segmentation presence flag) may be supported in the case of the binary tree segmentation.

The block segmentation may be performed, starting from the maximum encoding block up to the minimum encoding block. Alternatively, the block segmentation may be performed, starting from the minimum segmentation depth up to the maximum segmentation depth. That is, the segmentation may be recursively performed until the block size reaches the minimum encoding block size or until the segmentation depth reaches the maximum segmentation depth. In this case, the maximum encoding block size, the minimum encoding block size, and the maximum segmentation depth may be adaptively set depending on the encoding/decoding settings (e.g., image <slice, tile>, type <I/P/B>, encoding mode <intra/inter>, chrominance component <Y/Cb/Cr>, etc.). For example, when the maximum encoding block has a size of 128×128, the quadtree segmentation may be performed in the range of 8×8 to 128×128, and the binary tree segmentation may be performed in the range of 4×4 to 32×32 and in the case where the maximum segmentation depth is 3. Alternatively, the quadtree segmentation may be performed in the range of 8×8 to 128×128, and the binary tree segmentation may be performed in the range of 4×4 to 128×128 and in the case where the maximum segmentation depth is 3. The former case may indicate settings for image type I (e.g., a slice), and the latter case may indicate settings for image type P or B. As described in the above example, the segmentation settings such as the maximum encoding block size, the minimum encoding block size, and the maximum segmentation depth may be supported individually or in common depending on the segmentation schemes.

When a plurality of segmentation schemes are supported, the segmentation may be performed in a block support range of each of the segmentation schemes. When the block support ranges of the segmentation schemes overlap each other, the segmentation schemes may have their own priorities. For example, the quadtree segmentation may precede the binary tree segmentation. Also, when a plurality of segmentation schemes are supported, whether to perform the following segmentation may be determined depending on a result of the preceding segmentation. For example, when the result of the preceding segmentation indicates to perform segmentation, sub-encoding blocks obtained through the preceding segmentation may be reset to encoding blocks and then segmented, instead of the following segmentation being performed.

Alternatively, when the result of the preceding segmentation indicates not to perform segmentation, the segmentation may be performed according to the result of the following segmentation. In this case, when the result of the following segmentation indicates to perform segmentation, sub-encoding blocks obtained through the following segmentation may be reset to encoding blocks and then segmented. When the result of the following segmentation indicates not to perform segmentation, the segmentation is no longer performed. In this case, even though the result of the following segmentation indicates to perform segmentation and the sub-encoding blocks obtained through the following segmentation are reset to encoding blocks, the preceding segmentation may not be performed and only the following segmentation may be supported when the plurality of segmentation schemes are supported. That is, when the plurality of segmentation schemes are supported and the result of the preceding segmentation indicates not to perform segmentation, the segmentation is no longer performed.

For example, when an encoding block having a size of M×N is capable of quadtree segmentation and binary tree segmentation, a quadtree segmentation flag may be checked first. When the segmentation flag is 1, the encoding block may be segmented into four sub-encoding blocks having a size of (M>>1)×(N>>1). Then, each of the sub-encoding blocks may be reset to an encoding block, and segmentation (quadtree segmentation or binary tree segmentation) may be performed on the encoding block. When the segmentation flag is 0, a binary tree segmentation flag may be checked. When the binary tree segmentation flag is 1, the encoding block may be segmented into two sub-encoding blocks having a size of (M>>1)×N or M×(N>>1). Then, each of the sub-encoding blocks may be reset to an encoding block, and segmentation (binary tree segmentation) may be performed on the encoding block. When the segmentation flag is 0, the segmentation process is terminated, and encoding proceeds.

Although a case where a plurality of segmentation schemes are performed has been described as an example, the present invention is not limited thereto, and a combination of supporting various segmentation schemes may be possible. For example, a segmentation scheme such as a quadtree, a binary tree, and a quadtree+a binary tree may be used. In this case, the quadtree scheme may be set as a default segmentation scheme, and the binary tree scheme may be set as an additional segmentation scheme. Information about whether to support the additional segmentation scheme may be explicitly included in units of a sequence, a picture, a slice, a tile, or the like.

In the above example, information associated with segmentation, such as size information of encoding blocks, the range of supporting encoding blocks, and the maximum segmentation depth may be included in units of a sequence, a picture, a slice, a tile, or the like or may be implicitly determined. In summary, the range of allowable blocks may be determined by the maximum encoding block size, the range of supported blocks, the maximum segmentation depth, and the like.

The encoding block acquired by the segmentation being performed through the process may be set to have the maximum size for the inter-prediction or the intra-prediction. That is, the encoding block obtained after the block segmentation may have an initial size for segmentation of the prediction block for intra-prediction or inter-prediction. For example, when the encoding block has a size of 2M×2N, the prediction block may have a size smaller than or equal to that of the encoding block, i.e., a size of 2M×2N or M×N. Alternatively, the prediction block may have a size of 2M×2N, 2M×N, M×2N, or M×N. Alternatively, the prediction block may have the same size as the encoding block, i.e., a size of 2M×2N. In this case, the encoding block and the prediction block having the same size may mean that the prediction block is not segmented and prediction is performed with a size acquired through segmentation of the encoding block. That is, this means that segmentation information for the prediction block is not generated. The settings may be applied even to a transformation block, and transformation may be performed in units of segmented encoding blocks. That is, a square or rectangular block acquired through the segmentation result may be a block used for intra-prediction and inter-prediction and also may be a block used for transformation and quantization of a residual component.

Figure 3:
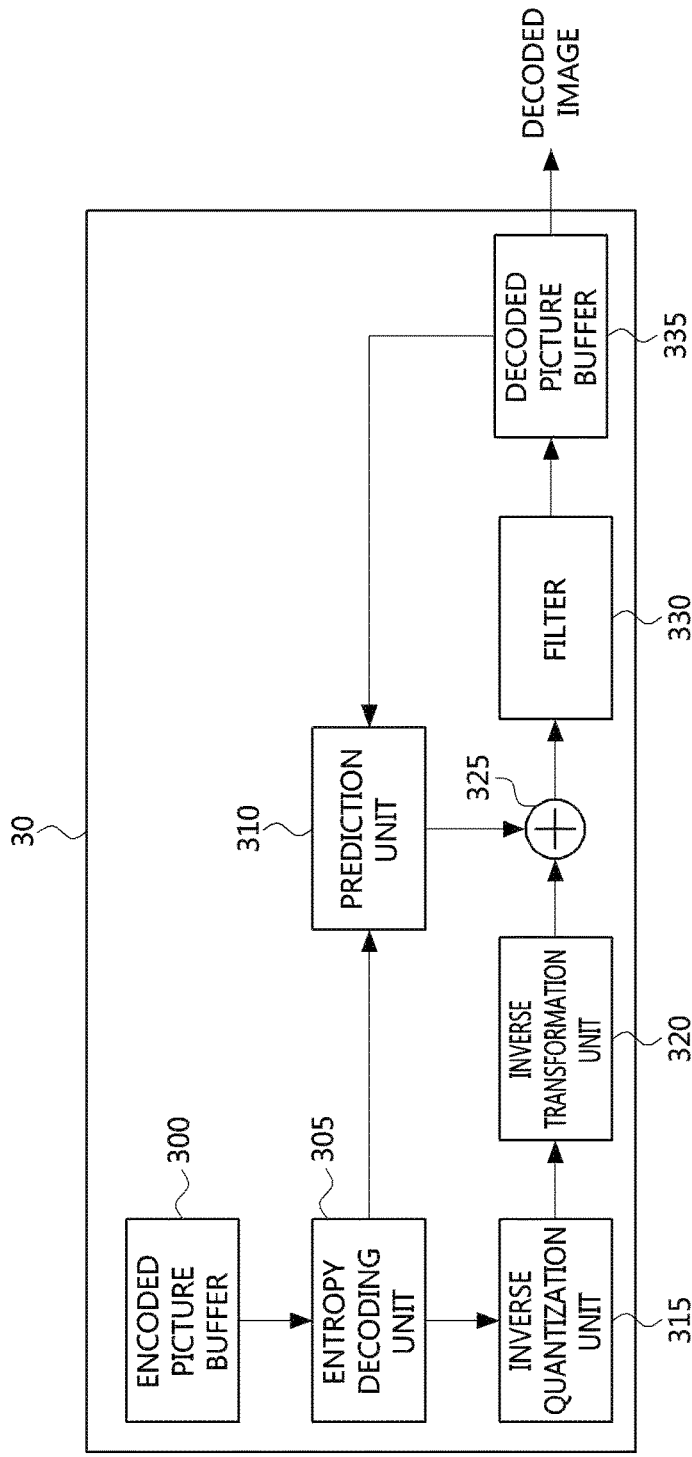
FIG. 3 is a block diagram of an image decoding apparatus according to an embodiment of the present invention.

FIG. 3 is a block diagram of an image decoding apparatus according to an embodiment of the present invention.

Referring to FIG. 3, an image decoding apparatus 30 may include an encoded picture buffer 300, an entropy decoding unit 305, a prediction unit 310, an inverse quantization unit 315, an inverse transformation unit 320, an adder-subtractor 325, a filter 330, and a decoded picture buffer 335.

Also, the prediction unit 310 may include an intra-prediction module and an inter-prediction module.

First, when an image bitstream is received from the image encoding apparatus the received bitstream may be stored in the encoded picture buffer 300.

The entropy decoding unit 305 may decode the bitstream to generate quantized coefficients, motion vectors, and other syntaxes. The generated data may be transferred to the prediction unit 310.

The prediction unit 310 may generate a prediction block on the basis of the data transferred from the entropy decoding unit 305. In this case, a reference picture list may be configured using a default configuration technique on the basis of a reference image stored in the decoded picture buffer 335.

The inverse quantization unit 315 may inversely quantize quantized transformation coefficients that are provided in the bitstream and decoded by the entropy decoding unit 305.

The inverse transformation unit 320 may apply inverse DCT, inverse integer transformation, or inverse-transformation techniques with similar concepts to the transformation coefficients to generate a residual block.

In this case, the inverse quantization unit 315 and the inverse transformation unit 320 may be implemented in various methods to inversely perform the processes performed by the transformation unit 210 and the quantization unit 215 of the image encoding apparatus 20, which have been described above, respectively. For example, the inverse quantization unit 315 and the inverse transformation unit 320 may use the same process and inverse transformation shared with the transformation unit 210 and the quantization unit 215 and may inversely perform the transformation and quantization process using information regarding the transformation and quantization process (e.g., a transformation size, a transformation form, a quantization type, etc.) which is received from the image encoding apparatus 20.

A restored image block may be generated by adding the residual block on which the inverse quantization and inverse transformation process is performed to the prediction block obtained by the prediction unit 310. The addition may be achieved by the adder-subtractor 325.

A deblocking filter may be applied to the restored image block as the filter 330 in order to remove a blocking phenomenon if necessary, and other loop filters may be additionally used before and after the decoding process in order to enhance video quality.

The image block on which the restoration and filtering are performed may be stored in the decoded picture buffer 335.

Figure 4:
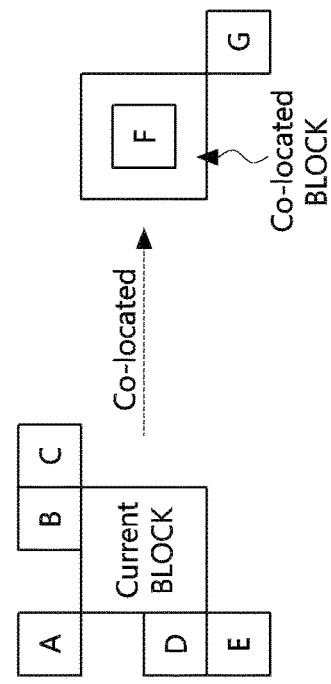
FIG. 4 is an example diagram showing a method of determining a candidate motion vector for setting a motion vector of a current block during inter-prediction according to an embodiment of the present invention.

FIG. 4 is an example diagram showing a method of determining a candidate motion vector for setting a motion vector of a current block during inter-prediction according to an embodiment of the present invention.

When a block similar to a current block is found among blocks in frames temporally different from a frame to which the current block belongs in order to generate a prediction block for the current block, a motion vector may be used as information indicating the corresponding block. In this case, when a coordinate value of a motion vector to be encoded is large, a bit loss rate may be very large. Accordingly, the encoding apparatus may select an optimal motion vector from among candidate motion vectors that are expected to be highly similar to the motion vector to be encoded and then may transfer a difference between the motion vector to be encoded and the optimal motion vector and the sign of the difference to the decoding apparatus. In this case, the optimal motion vector may be a motion vector having a minimal distance from the motion vector of the current block among the candidate motion vectors so that the difference may be minimized.

Here, how to determine the candidate motion vectors is a problem. Referring to FIG. 4, a motion vector of a neighboring block adjacent to the current block may be determined as a candidate motion vector. That is, since motion vectors of neighboring blocks A, B, C, D, and E adjacent to the current block are likely to be similar to the motion vector of the current block (Current BLOCK), the motion vectors may be determined as candidate motion vectors representing the motion vector of the current block.

Also, in addition to the neighboring blocks adjacent to the current block, a block (Co-located BLOCK) located at a position corresponding to that of the current block in a frame (or picture) which is temporarily adjacent to a frame (or picture) to which the current block belongs and which has been encoded may be determined as a candidate motion vector.

Also, two or more candidate motion vectors may be selected from neighboring blocks or blocks located at positions corresponding to that of the current block in temporarily adjacent frames which have been encoded. At this time, the number of candidate motion vectors and selection conditions for the candidate motion vector may be preset in the encoding apparatus and the decoding apparatus.

A case in which among the information indicating the optimal motion vector, the difference between the motion vector of the current block and the optimal motion vector, and the sign of the difference, the decoding apparatus can recognize the information indicating the optimal motion vector or the sign of the difference will be described below, and then a method of ignoring encoding of the information indicating the optimal motion vector or the sign of the difference will be described on the basis of the description.

FIG. 5 is an example diagram showing a region where a motion vector of a current block may be present when there are two candidate motion vectors.

The case in which the decoding apparatus can recognize the information indicating the optimal motion vector or the sign of the difference when there are two candidate motion vectors will be described with reference to FIG. 5. Also, a and b may be x or y coordinate values for candidate motion vectors but are simply referred to as candidate motion vectors.

First, it is assumed that when one of the two candidate motion vectors a and b is selected as the optimal motion vector and then a difference between the optimal motion vector and the motion vector k of the current block (moving vector difference; mvd) is encoded, the difference mvd between the optimal motion vector and the motion vector k of the current block has the relationship expressed by the following Equation 1.

$$|mvd| > \frac{|a-b|}{2} \qquad \text{[Equation 1]}$$

In the relationship of Equation 1, when the candidate motion vector a is the optimal motion vector, the motion vector k of the current block may be located a distance greater than $$\frac{|a-b|}{2}$$

(corresponding to half of the distance between the adjacent candidate motion vectors a and b) with respect to the candidate motion vector a. That is, the motion vector k of the current block may be located in a first region 51*a* and a second region 52*a* shown in FIG. 5. In this case, when the motion vector k of the current block is located in the second region 52*a*, the motion vector k may be closer to the candidate motion vector b than to the candidate motion vector a. The motion vector k of the current block being closer to the candidate motion vector b than to the candidate motion vector a is inconsistent with the assumption that the candidate motion vector a is the optimal motion vector. Therefore, the motion vector k of the current block cannot be located in the second region 52*a* and may be located in the first region 51*a*.

Also, in the relationship of Equation 1, when the candidate motion vector b is the optimal motion vector, the motion vector k of the current block may be located a distance greater than $$\frac{|a-b|}{2}$$

with respect to the candidate motion vector b. That is, the motion vector k of the current block may be located in a third region 51b and a fourth region 52b shown in FIG. 5. In this case, when the motion vector k of the current block is located in the third region 51b, the motion vector k may be closer to the candidate motion vector a than to the candidate motion vector b. The motion vector k of the current block being closer to the candidate motion vector a than to the candidate motion vector b is inconsistent with the assumption that the optimal motion vector is b. Therefore, the motion vector k of the current block cannot be located in the third region 51b and may be located in the fourth region 52b.

In summary, when Equation 1 is satisfied, it can be seen that the motion vector k of the current block is located in the first region 51a or the fourth region 52b. Thus, it is possible to omit the information indicating the optimal motion vector or the sign of the difference between the optimal motion vector and the motion vector of the current block.

Specifically, a method of omitting the sign of the difference between the optimal motion vector and the motion vector of the current block is as follows.

First, when a is the optimal motion vector, the motion vector k of the current block is located in the first region 51a. Accordingly, when the optimal motion vector is a, the motion vector k of the current block is located on the left side of a (at a position having a value smaller than a). Thus, it can be seen that the difference k-a between the motion vector k of the current block and the optimal motion vector (a on the assumption) is always negative.

Next, when b is the optimal motion vector, the motion vector k of the current block is located in the fourth region 52b. Accordingly, when the optimal motion vector is b, the motion vector k of the current block is located on the right side of b (at a position having a value greater than b). Thus, it can be seen that the difference k-b between the motion vector k of the current block and the optimal motion vector (b on the assumption) is always positive.

In summary, when Equation 1 is satisfied, the encoding apparatus may omit to transfer the sign of the difference between the optimal motion vector and the motion vector of the current block and then may transfer the size of the difference and the information indicating the optimal motion vector to the decoding apparatus. The decoding apparatus may determine whether Equation 1 is satisfied, and determine that the motion vector k of the current block is located in the first region 51a when the result of referring to the information indicating the optimal motion vector is that the optimal motion vector is a. Thus, the decoding apparatus may determine that the sign of the difference is negative. Also, the decoding apparatus may determine whether Equation 1 is satisfied, and determine that the motion vector k of the current block is located in the fourth region 52b when the result of referring to the information indicating the optimal motion vector is that the optimal motion vector is b. Thus, the decoding apparatus may determine that the sign of the difference is positive.

Meanwhile, a method of omitting the information indicating the optimal motion vector is as follows.

When the encoding apparatus omits the information indicating the optimal motion vector and transmits the size and sign of the difference between the optimal motion vector and the motion vector of the current block to the decoding apparatus, the decoding apparatus may check the difference through the size and sign of the difference and may add the candidate motion vector a, which may be the optimal motion vector, to the checked difference. When a value obtained at this time (which may be referred to as an estimated motion vector because the value may be an estimated value of a motion vector coordinate value of the current block) is closer to a than to b, the decoding apparatus may determine that the optimal motion vector is a. This is because when a is the optimal motion vector, a value obtained by adding the candidate motion vector a to the difference k-a is the motion vector k of the current block. In this case, the candidate motion vector a is closest to the motion vector k of the current block, and thus the encoding apparatus would have selected the candidate motion vector a as the optimal motion vector.

Similarly, the decoding apparatus may check the difference through the size and sign of the difference and may add the candidate motion vector b, which may be the optimal motion vector, to the checked difference. When a value obtained at this time is closer to b than to a, the decoding apparatus may determine that the optimal motion vector is b.

By performing the above processes on all the candidate motion vectors, several motion vectors that may be the optimal motion vector may be obtained. In this case, the decoding apparatus cannot select any one motion vector as the optimal motion vector, and thus the encoding apparatus cannot omit the information indicating the optimal motion vector. That is, the optimal motion vector may not be selected from among the candidate motion vectors. In this case, the above method is not applied.

Here, the method of omitting the information indicating the optimal motion vector has been described based on the case where there are two candidate motion vectors. However, it will be easily understood by those skilled in the art that the same method is applied even when there are a plurality of candidate motion vectors, and thus a detailed description thereof will be omitted.

FIG. 6 is a first example diagram showing a region where a motion vector of a current block may be present when there are three candidate motion vectors. FIG. 7 is a second example diagram showing a region where a motion vector of a current block may be present when there are three candidate motion vectors.

Referring to FIGS. 6 and 7, when there are three candidate motion vectors a, b, and c (which are represented with respect to an x or y coordinate in the drawings), intervals between the candidate motion vectors may be present between a and b and between b and c.

In this case, a large interval between the candidate motion vectors may be defined as DL, and a smaller interval between the candidate motion vectors may be defined as DS. As shown in FIGS. 6 and 7, when the interval between the candidate motion vectors a and b is large and the interval between the candidate motion vectors b and c is small, DL and DS are expressed by the following Equations 2 and 3.

$$DL = \frac{|a-b|}{2} \qquad \text{[Equation 2]}$$

-continued $$DS = \frac{|b-c|}{2} \quad \text{[Equation 3]}$$

In the relationship between Equation 2 and Equation 3, it is assumed that the relationship in the difference between the optimal motion vector and the motion vector of the current block satisfies the following Equation 4.

$$DS < |mvd| \leq DL \quad \text{[Equation 4]}$$

FIG. 6 shows a region where the motion vector of the current block is located under the conditions of Equation 4.

Referring to FIG. 6, when the candidate motion vector a is the optimal motion vector, the motion vector k of the current block is located a distance greater than DS and smaller than or equal to DL with respect to a and thus may be located in a first region 61a and a second region 62a. That is, in this case, the difference k-a may be negative or positive.

Also, when the candidate motion vector b is the optimal motion vector, the motion vector k of the current block is located a distance greater than DS and smaller than or equal to DL with respect to b and thus may be located in a third region 61b. In this case, it is assumed that the candidate motion vector b is the optimal motion vector. When the motion vector k of the current block is greater than b and has a value greater than DS with respect to b, the motion vector k of the current block is closer to the candidate motion vector c than to the candidate motion vector b. This may be inconsistent with the assumption that the candidate motion vector b is the optimal motion vector. Accordingly, when the candidate motion vector b is the optimal motion vector, the motion vector k of the current block cannot be greater than b, and thus it can be seen that the difference k-b is negative.

Also, when the candidate motion vector c is the optimal motion vector, the motion vector k of the current block is located a distance greater than DS and smaller than or equal to DL with respect to c and thus may be located in a fourth region 62c. In this case, it is assumed that the candidate motion vector c is the optimal motion vector. When the motion vector k of the current block is smaller than c and has a value smaller than DS with respect to c, the motion vector k of the current block is closer to the candidate motion vector b than to the candidate motion vector c. This may be inconsistent with the assumption that the candidate motion vector c is the optimal motion vector. Accordingly, when the candidate motion vector c is the optimal motion vector, the motion vector k of the current block cannot be smaller than c, and thus it can be seen that the difference k-c is positive.

In summary with reference to FIG. 6, when the optimal motion vector is a, the motion vector k of the current block is located in the first region 61a and the second region 62a, the difference k-a between the optimal motion vector a and the motion vector k of the current block may be negative in the first region 61a and positive in the second region 62a. Thus, the difference k-a may be positive and also may be negative. Accordingly, when the optimal motion vector is a, the decoding apparatus cannot recognize the sign of the difference. Thus, the encoding apparatus may transmit the sign and size of the difference k-a and the information indicating the optimal motion vector to the decoding apparatus.

However, when the optimal motion vector is b, the motion vector k of the current block is located in the third region 61b. Thus, the decoding apparatus may recognize that the sign of the difference k-b is negative. Also, when the optimal motion vector is c, the motion vector k of the current block is located in the fourth region 62c. Thus, the decoding apparatus may recognize that the sign of the difference k-c is positive. Accordingly, when the optimal motion vector is b or c, the encoding apparatus may omit to transfer the sign of the difference to the decoding apparatus.

In the relationship between Equation 2 and Equation 3, it is assumed that the relationship in the difference between the optimal motion vector and the motion vector of the current block satisfies the following Equation 5.

$$|mvd| > DL \quad \text{[Equation 5]}$$

FIG. 7 shows a region where the motion vector k of the current block is located under the conditions of Equation 5.

Referring to FIG. 7, when the candidate motion vector a is the optimal motion vector, the motion vector k of the current block is located a distance greater than DL with respect to a, and thus may be located in a first region 71a. In this case, it is assumed that the candidate motion vector a is the optimal motion vector. When the motion vector k of the current block is greater than a and is located a distance greater than DL with respect to a, the motion vector k of the current block is closer to the candidate motion vector b than to the candidate motion vector a. This may be inconsistent with the assumption that the candidate motion vector a is the optimal motion vector. Accordingly, when the candidate motion vector a is the optimal motion vector, the motion vector k of the current block cannot be greater than a, and thus the difference k-a may be negative.

Also, when the candidate motion vector b is the optimal motion vector, the motion vector k of the current block should be located a distance greater than DL with respect to b. In this case, it is assumed that the candidate motion vector b is the optimal motion vector. When the motion vector k of the current block is located a distance greater than DL with respect to b, the motion vector k of the current block is closer to the candidate motion vector a or c than to the candidate motion vector b. This may be inconsistent with the assumption that the candidate motion vector b is the optimal motion vector. Accordingly, when the candidate motion vector is b, there is no region where the motion vector k of the current block is present, and thus the candidate motion vector cannot be b.

Also, when the candidate motion vector c is the optimal motion vector, the motion vector k of the current block is located a distance greater than DL with respect to c and thus may be located in a second region 72c. In this case, it is assumed that the candidate motion vector c is the optimal motion vector. When the motion vector k of the current block is smaller than c and is located a distance greater than DL with respect to c, the motion vector k of the current block is closer to the candidate motion vector b than to the candidate motion vector c. This may be inconsistent with the assumption that the candidate motion vector c is the optimal motion vector. Accordingly, when the candidate motion vector c is the optimal motion vector, the motion vector k of the current block cannot be smaller than c, and thus the difference k-c may be always positive.

In summary with reference to FIG. 7 on the basis of Equation 5, when the optimal motion vector is a, the decoding apparatus may recognize that the motion vector k of the current block is located in the first region 71a and the difference k-a between the optimal motion vector a and the motion vector k of the current block is negative in the first region 71a. Accordingly, when the optimal motion vector is a, the encoding apparatus may omit to transfer the sign of the difference to the decoding apparatus.

Also, when the optimal motion vector is b, there is no region where the motion vector k of the current block is present. Accordingly, when Equation 5 is satisfied, the optimal motion vector cannot be b. Thus, the encoding apparatus may define a or c as a candidate motion vector with b being excluded from the candidate motion vector, generate information indicating that one of a and c is the optimal motion vector, and transmit the information to the decoding apparatus. The decoding apparatus may determine whether Equation 5 is satisfied and may interpret that a or c is the optimal motion vector through the information indicating the optimal motion vector. In this case, since one candidate motion vector is excluded, the number of bits (1 bit) smaller than the number of bits (2 bits) necessary to represent one of three motion vectors may be used, thereby increasing the efficiency of encoding and decoding.

Also, when the optimal motion vector is c, the decoding apparatus may recognize that the motion vector k of the current block is located in the second region 72c and the difference k-c between the optimal motion vector c and the motion vector k of the current block is positive in the second region 72c. Accordingly, when the optimal motion vector is c, the encoding apparatus may omit to transfer the sign of the difference to the decoding apparatus.

FIG. 8 is a flowchart showing an image decoding method using inter-prediction according to an embodiment of the present invention.

Referring to FIG. 8, the image decoding method using inter-prediction includes receiving a bitstream (S100), acquiring a portion of information indicating a motion vector of a current block to be decoded in the received bitstream (S110), acquiring the motion vector of the current block by using the acquired information to determine the remaining information other than the portion (S120), and generating a prediction block for the current block through inter-prediction that uses the motion vector of the current block (S130).

Here, the information indicating the motion vector of the current block may include at least one of the size of a difference between the motion vector of the current block and an optimal motion vector selected from among two or more candidate motion vectors, the sign of the difference, and the information indicating the optimal motion vector.

Here, the acquiring of the motion vector of the current block (S120) may include determining whether the size of the difference corresponds to a predetermined condition and determining the sign of the difference on the basis of an optimal motion vector acquired from the information indicating the optimal motion vector when the size of the difference corresponds to the predetermined condition.

Here, the predetermined condition may be set on the basis of an interval between adjacent vectors among the two or more candidate motion vectors.

Here, the determining of whether the size of the difference corresponds to the predetermined condition may include obtaining a largest interval between the adjacent vectors and a smallest interval between the adjacent vectors and comparing the largest interval and the smallest interval to the size of the difference.

Here, the predetermined condition may be set on the basis of half of the interval between the adjacent vectors.

Here, the acquiring of the motion vector of the current block (S120) may include acquiring the difference using the size of the difference and the sign of the difference, determining an estimated motion vector of the current block by adding a first candidate motion vector among the two or more candidate motion vectors to the acquired difference, determining whether the estimated motion vector has a coordinate value closest to that of the first candidate motion vector among the two or more candidate motion vectors, and determining the optimal motion vector on the basis of the determination result.

Here, the determining of the estimated motion vector and the determining of whether the estimated motion vector has the coordinate value closest to that of the first candidate motion vector may be repeatedly performed by replacing the remaining candidate motion vectors other than the first candidate motion vector with the first candidate motion vector.

Here, the determining of the optimal motion vector may include, when the result of the repetition is that only one candidate motion vector has the closest coordinate value, determining the corresponding candidate motion vector as the optimal motion vector.

Here, the acquiring of the motion vector of the current block (S120) may include determining whether the size of the difference corresponds to a predetermined condition and excluding at least one of the two or more candidate motion vectors and determining the optimal motion vector among the remaining candidate motion vectors when the size of the difference corresponds to the predetermined condition.

FIG. 9 is a block diagram showing an image decoding apparatus using inter-prediction according to an embodiment of the present invention.

Referring to FIG. 9, an image decoding apparatus 200 using inter-prediction may include at least one processor 210 and a memory 220 configured to store instructions for instructing the at least one processor 210 to perform at least one step.

Here, the image decoding apparatus 200 may further include a communication module 230 configured to receive a bitstream from the image encoding apparatus through a wired/wireless network.

Here, the image decoding apparatus 200 may further include a local storage 240 configured to store a reference picture, a decoded block, and the like necessary for an image decoding process.

Here, the at least one step may include receiving a bitstream, acquiring a portion of information indicating a motion vector of a current block to be decoded in the received bitstream, acquiring the motion vector of the current block by using the acquired information to determine the remaining information other than the portion, and generating a prediction block for the current block through inter-prediction that uses the motion vector of the current block.

Here, the information indicating the motion vector of the current block may include at least one of the size of a difference between the motion vector of the current block and an optimal motion vector selected from among two or more candidate motion vectors, the sign of the difference, and the information indicating the optimal motion vector.

Here, the acquiring of the motion vector of the current block may include determining whether the size of the difference corresponds to a predetermined condition and determining the sign of the difference on the basis of an optimal motion vector acquired from the information indicating the optimal motion vector when the size of the difference corresponds to the predetermined condition.

Here, the predetermined condition may be set on the basis of an interval between adjacent vectors among the two or more candidate motion vectors.

Here, the determining of whether the size of the difference corresponds to the predetermined condition may include obtaining a largest interval between the adjacent vectors and a smallest interval between the adjacent vectors and comparing the largest interval and the smallest interval to the size of the difference.

Here, the predetermined condition may be set on the basis of half of the interval between the adjacent vectors.

Here, the acquiring of the motion vector of the current block may include acquiring the difference using the size of the difference and the sign of the difference, determining an estimated motion vector of the current block by adding a first candidate motion vector among the two or more candidate motion vectors to the acquired difference, determining whether the estimated motion vector has a coordinate value closest to that of the first candidate motion vector among the two or more candidate motion vectors, and determining the optimal motion vector on the basis of the determination result.

Here, the determining of the estimated motion vector and the determining of whether the estimated motion vector has the coordinate value closest to that of the first candidate motion vector may be repeatedly performed by replacing the remaining candidate motion vectors other than the first candidate motion vector with the first candidate motion vector.

Here, the determining of the optimal motion vector may include, when the result of the repetition is that only one candidate motion vector has the closest coordinate value, determining the corresponding candidate motion vector as the optimal motion vector.

Here, the acquiring of the motion vector of the current block may include determining whether the size of the difference corresponds to a predetermined condition and excluding at least one of the two or more candidate motion vectors and determining the optimal motion vector among the remaining candidate motion vectors when the size of the difference corresponds to the predetermined condition.

Here, the image decoding apparatus 200 may be, for example, a desktop computer, a laptop computer, a notebook, a smartphone, a tablet PC, a mobile phone, a smart watch, smart glasses, an e-book reader, a portable multimedia player (PMP), a portable game machine, a navigation device, a digital camera, a digital multimedia broadcasting (DMB) player, a digital audio recorder, a digital audio player, a digital video recorder, a digital video player, a personal digital assistant (PDA), or the like having a communication capability.

The methods according to the present invention may be implemented in the form of program instructions that are executable through various computer means and may be recorded on a computer-readable medium. The computer-readable medium may also include, alone or in combination with the program instructions, data files, data structures, and the like. The program instructions recorded on the computer-readable medium may be designed and configured specially for the present invention or may be known and available to those having skill in the computer software arts.

Examples of computer-readable media may include hardware devices that are specially configured to store and perform program instructions, such as read-only memory (ROM), random access memory (RAM), flash memory, and the like. Examples of program instructions may include machine code, such as produced by a compiler, and higher level code that may be executed by a computer using an interpreter. The described hardware devices may be configured to act as one or more software modules in order to perform the operations of the present invention, or vice versa.

Furthermore, the above-mentioned method or apparatus may be implemented by all or some of the elements or functions being combined or separated.

While the present invention has been particularly shown and described with reference to exemplary embodiments thereof, it will be understood by those skilled in the art that various changes in form and details may be made therein without departing from the spirit and scope of the invention as defined in the following claims.

The invention claimed is:

1. An image decoding method using inter-prediction, the image decoding method comprising:
   receiving a bitstream;
   determining a current block by dividing a coding block based on division information included in the bitstream;
   acquiring a motion vector candidate of the current block based on a motion vector indicator indicating the motion vector candidate from among a plurality of motion vector candidates;
   acquiring a motion vector difference between a motion vector of the current block and the motion vector candidate based on at least one of size information indicating a size of the motion vector difference or sign information indicating a sign of the motion vector difference, wherein the sign information is signaled when the size of the motion vector difference is greater than a pre-defined threshold size while the sign information is not signaled when the size of the motion vector difference is less than or equal to the pre-defined threshold size;
   acquiring the motion vector of the current block based on the motion vector candidate and the motion vector difference; and
   generating a prediction block for the current block through the inter-prediction that uses the motion vector of the current block,
   wherein the division information includes at least one of a quad division flag indicating whether the coding block is divided based a quad tree division, a binary division flag indicating whether the coding block is divided based on a binary tree division, or a division direction flag indicating whether the coding block is divided in a vertical direction or in a horizontal direction,
   wherein the division direction flag is selectively signaled based on a division type of a higher block to which the coding block belongs,
   wherein the higher block is representative of a block having a smaller division depth than the coding block, and
   wherein, based on the prediction block and a residual block of the current block obtained from the bitstream, the current block is reconstructed.

2. The image decoding method of claim 1, wherein the coding block is divided based on at least one of the quad tree division or the binary tree division.

3. The image decoding method of claim 2, wherein only the quad tree division is used to divide the coding block when the coding block has a size of 128×128.

4. The image decoding method of claim 2, wherein the binary tree division is allowed only when the quad tree division is no longer applicable.

5. An image encoding method using inter-prediction, the image encoding method comprising:

encoding division information indicating a number of a plurality of sub-coding blocks into which a coding block is divided;

encoding a motion vector of a current block for generating a prediction block of the current block through the inter-prediction, the current block being one of the sub-coding blocks, wherein encoding the motion vector of the current block comprises:

encoding a motion vector indicator indicating a motion vector candidate of the current block from among a plurality of motion vector candidates; and encoding at least one of size information indicating a size of a motion vector difference between the motion vector of the current block and the motion vector candidate, or sign information indicating a sign of the motion vector difference; and generating a bitstream based on the division information, the motion vector indicator, the size information, and the sign information, wherein the sign information is encoded when the size of the motion vector difference is greater than a pre-defined threshold size while the sign information is not encoded when the size of the motion vector difference is less than or equal to the pre-defined threshold size, wherein the division information includes at least one of a quad division flag indicating whether the coding block is divided based a quad tree division, a binary division flag indicating whether the coding block is divided based on a binary tree division, or a division direction flag indicating whether the coding block is divided in a vertical direction or in a horizontal direction, wherein the division direction flag is selectively encoded based on a division type of a higher block to which the coding block belongs, wherein the higher block is representative of a block having a smaller division depth than the coding block, and wherein, based on an original block of the current block and the prediction block, a residual block of the current block is encoded.

6. A non-transitory computer-readable medium storing a bitstream generated by an encoding method, the method comprising:

encoding division information indicating a number of a plurality of sub-coding blocks into which a coding block is divided;

encoding a motion vector of a current block for generating a prediction block of the current block through the inter-prediction, the current block being one of the sub-coding blocks, wherein encoding the motion vector of the current block comprises:

encoding a motion vector indicator indicating a motion vector candidate of the current block from among a plurality of motion vector candidates; and encoding at least one of size information indicating a size of a motion vector difference between the motion vector of the current block and the motion vector candidate, or sign information indicating a sign of the motion vector difference; and generating the bitstream based on the division information, the motion vector indicator, the size information, and the sign information, wherein the sign information is encoded when the size of the motion vector difference is greater than a pre-defined threshold size while the sign information is not encoded when the size of the motion vector difference is less than or equal to the pre-defined threshold size, wherein the division information includes at least one of a quad division flag indicating whether the coding block is divided based a quad tree division, a binary division flag indicating whether the coding block is divided based on a binary tree division, or a division direction flag indicating whether the coding block is divided in a vertical direction or in a horizontal direction, wherein the division direction flag is selectively encoded based on a division type of a higher block to which the coding block belongs, wherein the higher block is representative of a block having a smaller division depth than the coding block, and wherein, based on an original block of the current block and the prediction block, a residual block of the current block is encoded.

\* \* \* \* \*